US012619809B2

(12) United States Patent (10) Patent No.: US 12,619,809 B2
Venini et al. (45) Date of Patent: May 5, 2026

(54) METHOD FOR FAULT DETECTION IN SAFETY MECHANISMS

(71) Applicant: XILINX, INC., San Jose, CA (US)

(72) Inventors: Federico Venini, San Jose, CA (US); David Tran, San Jose, CA (US)

(73) Assignee: XILINX, INC., San Jose, CA (US)

( * ) Notice: Subject to any disclaimer, the term of this patent is extended or adjusted under 35 U.S.C. 154(b) by 735 days.

(21) Appl. No.: 17/985,735

(22) Filed: Nov. 11, 2022

(65) Prior Publication Data

US 2024/0160818 A1 May 16, 2024

(51) Int. Cl.
*G06F 30/33* (2020.01)
*G06F 30/323* (2020.01)
*G06F 119/02* (2020.01)

(52) U.S. Cl.
CPC ............ *G06F 30/33* (2020.01); *G06F 30/323* (2020.01); *G06F 2119/02* (2020.01)

(58) Field of Classification Search
USPC ......................................................... 716/103
See application file for complete search history.

(56) References Cited

U.S. PATENT DOCUMENTS

| | | | |
|---|---|---|---|
| 8,145,334 B2 | 3/2012 | Do et al. | |
| 10,295,594 B2 | 5/2019 | Kourfali et al. | |
| 2007/0168789 A1* | 7/2007 | Udell ............ | G01R 31/318371 |
| | | | 714/724 |
| 2024/0110973 A1* | 4/2024 | Wohl ................ | G01R 31/2834 |

* cited by examiner

*Primary Examiner* — Bryce M Aisaka

(74) *Attorney, Agent, or Firm* — Patterson + Sheridan, LLP

(57) ABSTRACT

Safety mechanisms are embedded into a System on a Chip (SoC) and are operable to detect faults present in the logic circuitry in the SoC. Various types of faults in logic circuitry can occur, for example, a bit stuck at 0 or 1, or a transient or temporary fault due to radiation impacting the SoC. SoC devices are required to meet certain automotive safety integrity standards. The most stringent automotive safety integrity level requires that 90% of random latent faults are detected in all relevant logic, including all safety mechanism. Examples disclosed include hardware based checkers and hardware or software based pattern generation methods that achieve high online fault coverage in safety mechanism circuitry used for functional safety. A hardware based safety mechanism monitors the logic circuitry during operation. Any time the safety mechanism detects any faults in the logic circuitry, a fault notification is propagated to upstream logic.

20 Claims, 7 Drawing Sheets

118

METHOD FOR FAULT DETECTION IN SAFETY MECHANISMS

TECHNICAL FIELD

Examples of the present disclosure generally relate to fault detector mechanisms, and in particular, to a method for detecting faults in a safety mechanism circuit.

BACKGROUND

Certain silicon system on chip (SoC) devices are required to meet ISO-26262 Automotive Safety Integrity Level D (ASIL-D) standards. The ASIL-D requires the Latent Fault Metric (LFM) being greater than or equal to 90%. This means that at least 90% of random, multi-point faults are detected in all relevant logic, including all hardware SM logic. This goal can be achieved by several methods such as:

Method 1) adding Logic Built-In Self-Test (LBIST) circuitry

Method 2) adding dedicated error injection registers around the Safety Mechanisms and running test software (aka STL or Software Test Library) to drive these registers. Any method can be activated periodically, or upon reset or key-on.

Method 3) running key-on STLs that specifically target the SM logic without any support of dedicated error injection registers.

Method 1 is costly in area, design, and validation efforts in order to integrate the method into functional logic. Because of this burden, LBIST is usually done at a coarse level of granularity, therefore compounding the area cost. It also often yields insufficient fault coverage.

Methods 2 and 3 could possibly take up considerable CPU resources. In many cases it also requires adding dedicated test registers driving all major inputs to the Safety Mechanisms that software uses to inject test patterns to detect faults.

SUMMARY

Disclosed is a method for testing Safety Mechanisms (SMs) in a system on chip (SoC). SMs are utilized to detect faults in a SoC. The method includes generating safety mechanism test patterns offline through a test pattern generator or else generating the test patterns in a hard-wired pattern generator. The method includes loading the SM test patterns into a pattern buffer coupled to a SM, and transmitting the test patterns to the SM. The method is intended to verify the functionality of the SM itself. The method is not verifying the functionality of the circuitry being verified by the SM.

These and other examples may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
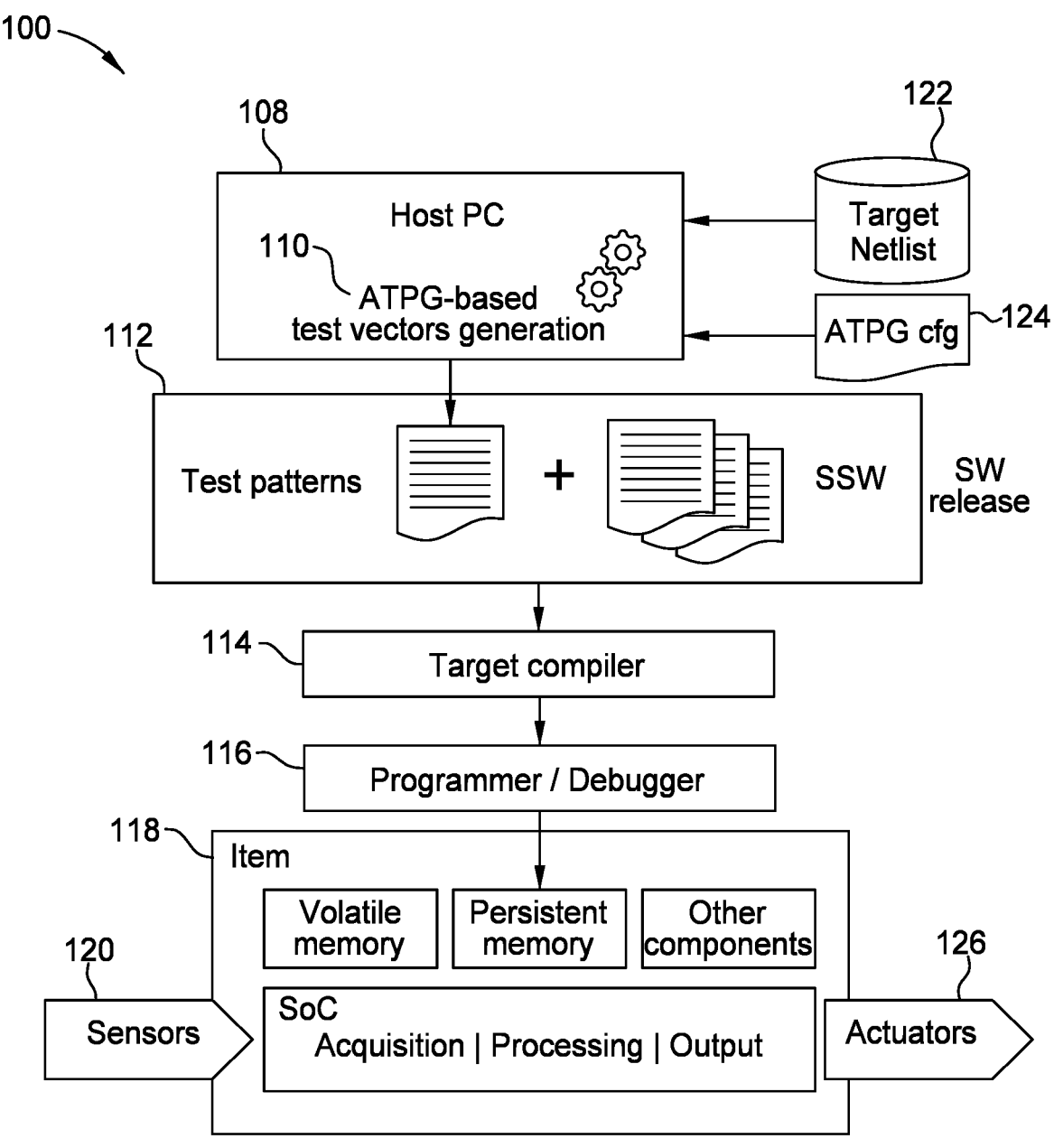
FIG. 1 illustrates an example, according to one example, of an automatic test pattern generator (ATPG) Test Pattern Generation Method and Deployment System.

This disclosure proposes novel mechanisms to achieve high online fault coverage in Safety Mechanism (SM) logic utilized for functional safety. These mechanisms use a combination of hardware and software to reduce silicon cost to meet safety standard requirements. This disclosure proposes efficient mechanisms to realize the benefits while reducing the costs, i.e., computational resources and silicon area of the SoC.

A Safety Mechanism is circuitry embedded into a System on a Chip (SoC). A SM is designed to detect faults present in the logic circuitry in the SoC. This disclosure relates to hardware based safety mechanisms. A hardware based SM monitors SoC logic circuitry during operation. Any time a SM detects any faults in the logic circuitry, a fault notification is propagated to downstream logic. A fault in logic circuitry typically means the circuitry contains a bit stuck at 0 or 1 all the time but other, more complex faults can arise such as open or bridging faults, delay faults, etc. Or, sometimes a fault can be transient, due to radiation impacting the SoC.

An example of a SM technique is to provide a duplicate CPU, thus creating two instances of a CPU. This SM logic circuitry constantly monitors various outputs of the CPUs. As soon as any errors are detected in the CPU, an interrupt is triggered and the system is notified that a fault occurred somewhere in the CPU. An action is then taken, for example to reset the CPU or recover it from an unknown state.

This disclosure focuses on methods for detecting failures in safety mechanism logic, i.e., the logic whose function is to detect an error in the SoC hardware. The methods in the disclosure are used to verify that the SM logic is operating correctly. This disclosure proposes to add a small Pattern Buffer connected to the inputs of a Safety Mechanisms logic device, along with a small controller.

The controller allows software to either directly load the Pattern Buffer with safety mechanism test patterns, or else the software triggers a DMA channel (available in most typical SoC's) and lets the hardware run autonomously until the complete loading of the safety mechanism test patterns. The controller is also in charge of initiating and sequencing the test procedure, notifying the error handler when to compare the test points, and supplying expected values to the error handler circuitry. The error handler circuitry is in charge of accumulating the logic values from the test points, detecting errors if any, and notifying upstream logic in case an error is detected.

Beneficial features disclosed herein include:

A) Loading the Pattern Buffer with safety mechanism test patterns pre-computed off-line, for example, from automatic test pattern generator (ATPG) software. ATPG software generates test patterns targeted to the specific gate level netlist implementation of the SM so as to be close to optimum. This translates to a major saving compared to manual test pattern generation or using software to generate and drive test patterns on-the-fly, as a normal software test library (STL) implementation would.

B) Reducing the number of bits in the Pattern Buffer by loading it piecewise from bulk storage such as DRAM (since test pattern volume can be high for complicated circuits).

C) Sharing the same Pattern Buffer between all Safety Mechanisms of the same type. All such SMs can be tested in parallel, in series, or in any combination appropriate to the functional operation of the SoC.

D) Optionally reducing wiring congestion by partitioning the set of m inputs to the Safety Mechanism into p sets, so that only m/p wires need routing. A local (per-SM) assembler would re-assemble the test patterns as needed before feeding to the SM.

E) For certain specific types of Safety Mechanisms, replacing the Pattern Buffer by hard wiring the logic to generate test patterns since they are simple and take up very little area (i.e., reduce costs). This applies, for example, to lockstep checkers or parity checkers, as described in FIGS. 4A, 4B and 5A below.

FIG. 1 illustrates an example, according to one example, of an ATPG Test Pattern Generation Method and Deployment System 100. The use of ATPG software is a method to generate sets of test patterns configured to maximize the testing comprehensiveness on the target logic (safety mechanism logic, in our case) while minimizing the test pattern count.

ATPG software is used to test IC's that come off the manufacturing line. ATPG-generated patterns can also be used to test wafers.

The ATPG generator software 110 is operated offline on a host PC 108 and it is not, in any way, intended to operate at runtime on the target device during mission mode.

The ATPG generator software 110 receives configuration information 124 and the knowledge of a compiled target netlist model 122 to generate the proper test patterns 112. This demonstrates that performing test pattern generation on the target device would be impractical.

Using the ATPG pre-computed safety mechanism test patterns 112 stored in memory instead of generating them "on the fly", i.e., on the target device using a Linear Feedback Shift Register (LFSR), minimizes the complexity and the area of the test logic. A LFSR is a low-cost, low-complexity, hardware mechanism used to generate pseudo-random patterns. LBIST solutions typically use a LFSR to generate on-the-fly safety mechanism test patterns.

Safety mechanism test patterns (pure data) 112 can be bundled within the regular SW releases, or deployed into the persistent memory of the target item during firmware flashing operations.

The Target compiler 114 serves to translate software instructions and data into a binary file that can be loaded in memory and read at runtime.

The Programmer/Debugger 116 serves to program the target device by loading the binary file into a non-volatile (or persistent) memory from which a CPU core will fetch instructions and data at runtime. It is also used to give programmers the visibility of internal registers and memories for debugging purposes.

A generic example of an embedded system 118 is illustrated. The embedded system 118 may include sensor inputs, actuator outputs, discrete memories (persistent and volatile), an SoC as a processing unit and other generic components, A generic sensors 120 input is used to convey the fact that the target device can be an embedded system.

A generic actuators 126 output is used to convey the fact that the target device can be an embedded system.

Besides CPU Lockstep testing, other examples of SMs include parity checkers, ECC (Error Correction Codes), CRC (Cyclic Redundancy Checks), WDT (Watchdog Timers), etc. Lockstep checking can be used for any logic block not just CPU's.

Parity checkers, ECC, and CRC are SMs that add redundancy without duplicating the entire block being checked. There are also other ways of monitoring devices such as Watchdog Timers, etc.

Figure 2:
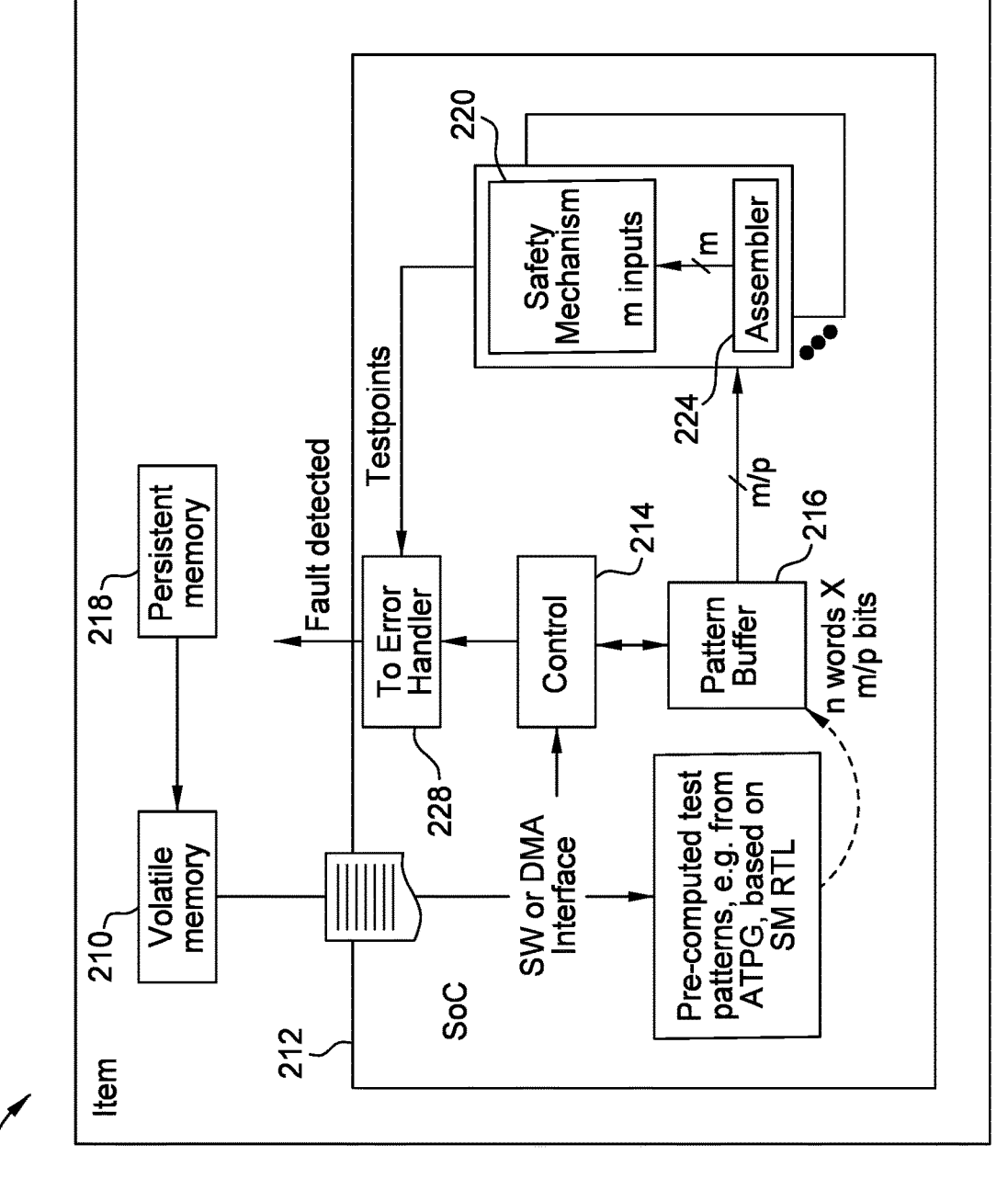
FIG. 2 illustrates an example, according to one example, of an ATPG Test Pattern Loading System.

FIG. 2 illustrates an example, according to one example of a System 118, i.e., an ATPG Test Pattern Loading System, coupled with a new method for SM error detection. The System 118 is also shown in FIG. 1.

The Safety Mechanism 220 detects errors in functional circuits (not shown in the figures). A System on a Chip (Soc) 212 contains a Pattern Buffer 216, a plurality of SMs 220 (that may be of different types), Control Circuitry 214, and related circuits.

External memory, i.e., persistent memory 218 and volatile memory 210, are used to hold the ATPG output (114/116 shown in FIG. 1) of the disclosed methods. The ATPG generator software 110 computes a set of safety mechanism test patterns to obtain a certain desirable coverage while minimizing the number of patterns. This is done offline. Safety mechanism test patterns can then be loaded into the volatile memory 218 at boot time and transferred into the Pattern Buffer 216 at test time. Then, the test patterns are fetched from the Pattern Buffer 216 when required.

Volatile memory 210 serves to store executables, instructions and data that are loaded and stored at runtime.

Persistent memory 218 serves as a long-term storage for the binary code (instructions and data) while the System 118 is powered off. When the System 118 is in mission mode, the binary code is typically moved to the volatile memory 210 hierarchies that are faster and accessible by CPU cores and other resources of the SoC 212.

The Assembler 224 periodically feeds the primary inputs of the safety mechanisms to be tested. The Assembler 224 retrieves safety mechanism test patterns at runtime from the Pattern Buffer 216. The Assembler 224 then decodes the safety mechanism test patterns, and configures the safety mechanism test patterns for the input interface of the functional block (FIG. 3, 310) they interface to.

The ATPG test patterns contain n words comprising m/p number of inputs to the SM 220. In some examples, the SM 220 could have thousands of inputs. The number of inputs m is divided by an integer p to reduce the total number of signals sent from the common Pattern Buffer 216 to a potentially large number of SM 220. At the SM 220, the m/p signals are reassembled to m signals before being fed to the SM.

For each m-bit input pattern fed to the SM, a specific SM 220 output value is expected. The Control Circuitry 214 compares the values it sees on the test points to the values it expects to see. A fault is detectable when the value observed on the test points is different than the expected value.

The method illustrated in FIG. 2 can be used to test several SMs 220.

The Error Handler 228 detects safety mechanism errors upon detecting test point value errors or mismatches and responds with appropriate action, for example resetting appropriate portions of the SoC, or reporting status to the system outside of the SoC.

Figure 3B:
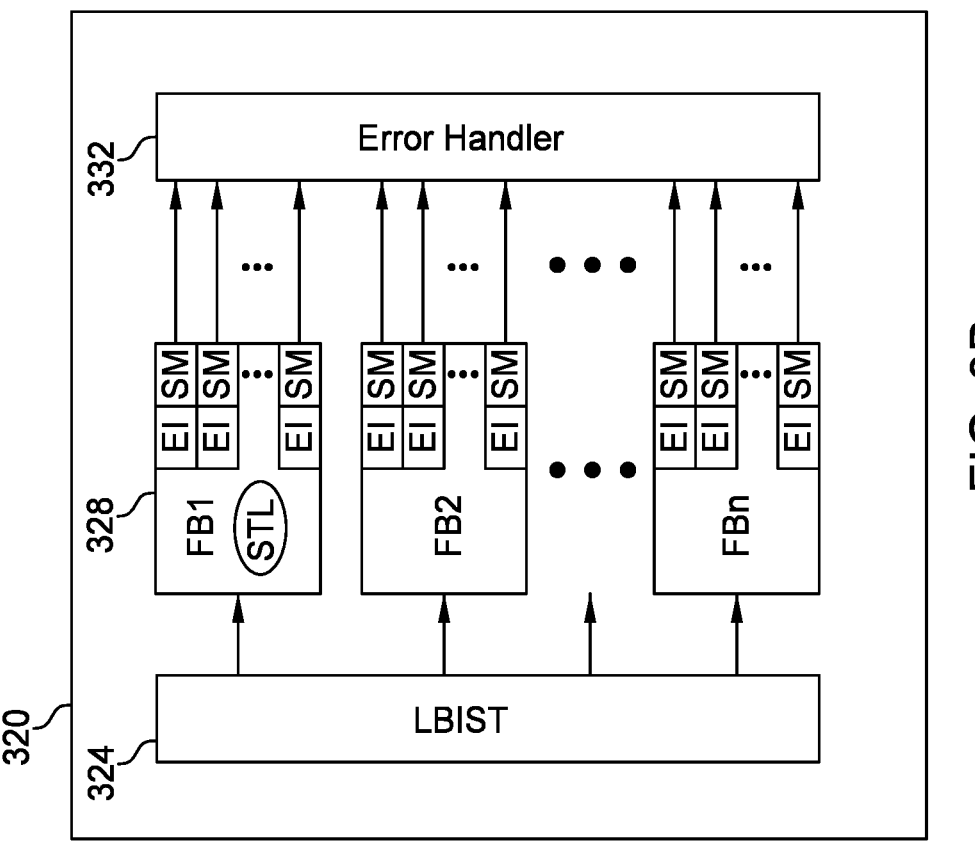
FIG. 3B illustrates an example, according to one example, of a System on a Chip with Functional Safety using existing approaches.
Figure 3A:
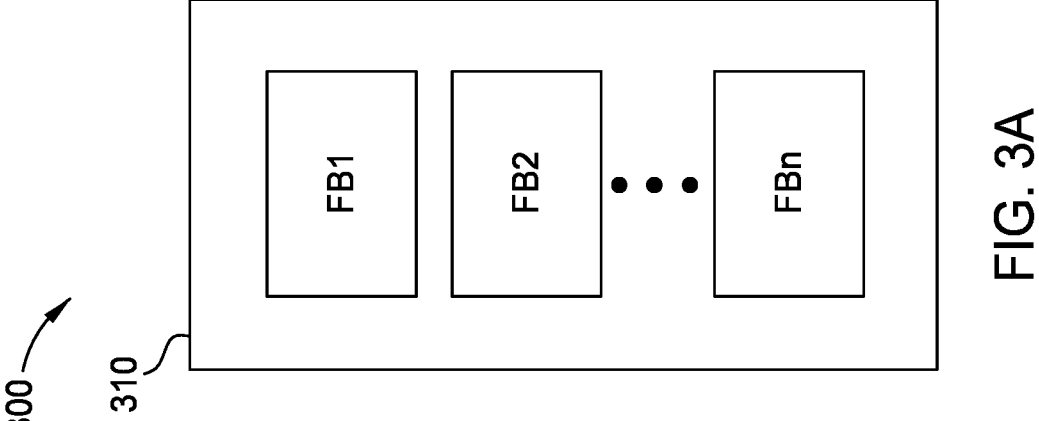
FIG. 3A illustrates an example, according to one example, of a System on a Chip (SoC).

FIG. 3A illustrates an example 300, according to one example, of a generic SoC 310 comprising multiple functional blocks FB1 to FBn, where n can be in the dozens to hundreds, depending on the granularity of the FB's.

The functional blocks FB1 to FBn in the SoC 310 may include, in some examples, processors, caches, memories, special-purpose hardware accelerators, logic for data processing or routing, DMA's, and Interconnects.

FIG. 3B illustrates an example, according to one example, of a System on a Chip 320 with Functional Safety using existing approaches. Functional block 1 (FB1) in this example is a processor, which can execute STL.

The Logic BIST (LBIST) 324 serves to generate pseudo-random patterns to test all or parts of the SoC 320, typically at Power-on reset to ensure basic functionality of the SoC 320.

Each functional block FB1 to FBn 328 includes an Error Injection (EI), as per Method 2 in the Background section, and a SM. An Error Handler 332 receives error data from the functional blocks FB1 to FBn 328.

Figure 3D:
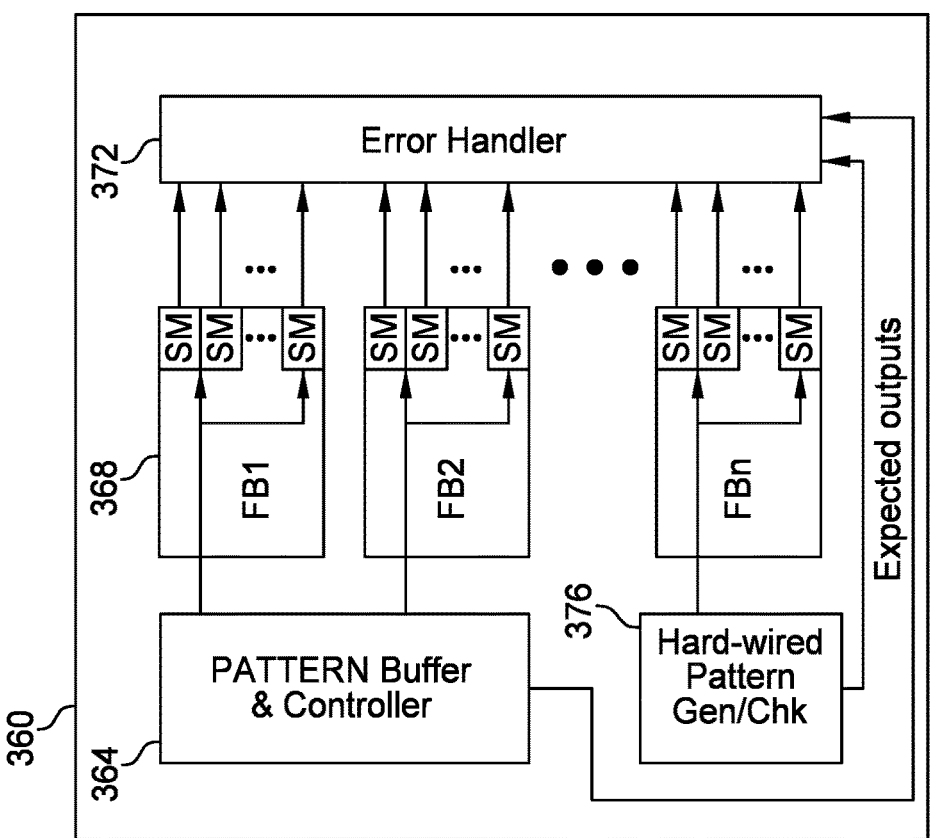
FIG. 3D illustrates an example, according to one example, of a System on a Chip with Functional Safety using a variation.
Figure 3C:
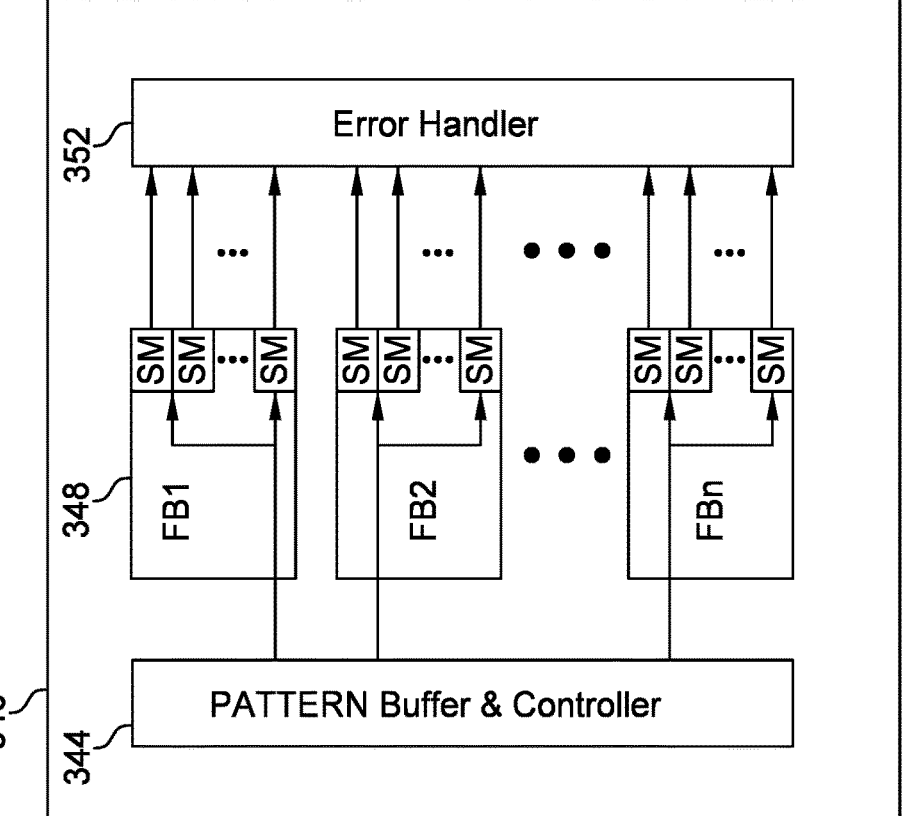
FIG. 3C illustrates an example, according to one example, of a System on a Chip with Functional Safety with a proposed approach.

FIG. 3C illustrates an example, according to one example, of a System on a Chip 340 with Functional Safety with a proposed approach. The Pattern Buffer and Controller 344 is preloaded with data generated offline by the ATPG generator software 110. Each functional block FB1 to FBn 348 includes a number of SMs. An Error Handler 352 receives error data from the functional blocks FB1 to FBn 348.

The method in FIG. 3C includes the ATPG and the Pattern Buffer and Controller 344.

FIG. 3D illustrates an example, according to one example, of a System on a Chip 360 with Functional Safety using a variation. FIG. 3D illustrates a combination of both approaches, i.e., the ATPG+Pattern Buffer and Controller 364 and the hard-wired pattern generator 376. Each functional block FB1 to FBn 368 includes a number of SMs. The Pattern Buffer and Controller 364 is preloaded with data generated offline by the ATPG generator software 110. The hard-wired pattern generator 376 generates the input test patterns (i.e., a and b in FIG. 5, 508), and also the expected data (i.e., z in FIG. 5, 508) which are sent to the Error Handler circuit 372 to detect a possible difference between the values on the test points and the expected results.

Each of the functional blocks FB1 to FBn 368 receives data from either the Pattern Buffer and Controller 364, or from the Hard-wired Pattern Generator 376. An Error Handler 372 receives outputs from the SM's in functional blocks FB1 to FBn 368. The Error Handler also receives "expected data" from the Pattern Buffer and Controller 364 and the Hard-wired pattern generator 376, and uses this expected data to compare against the outputs of the SM's.

Figure 4B:
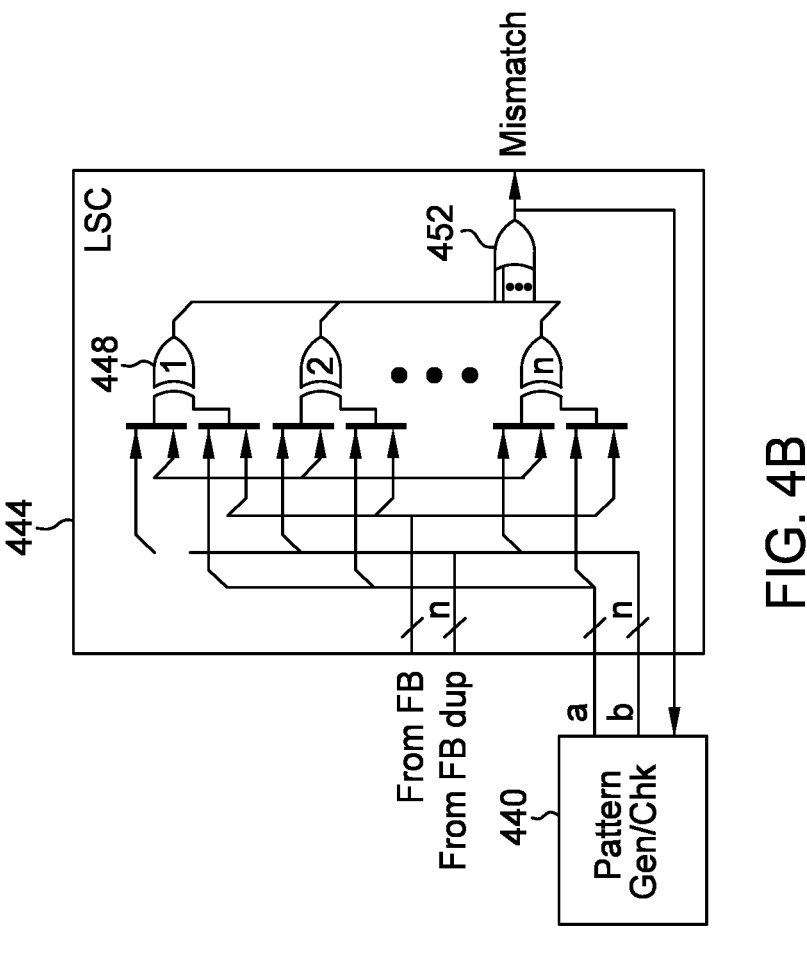
FIG. 4B illustrates an example, according to one example, of a Lockstep Checker Safety Mechanism with a Hardwired Pattern Generator/Checker.
Figure 4A:
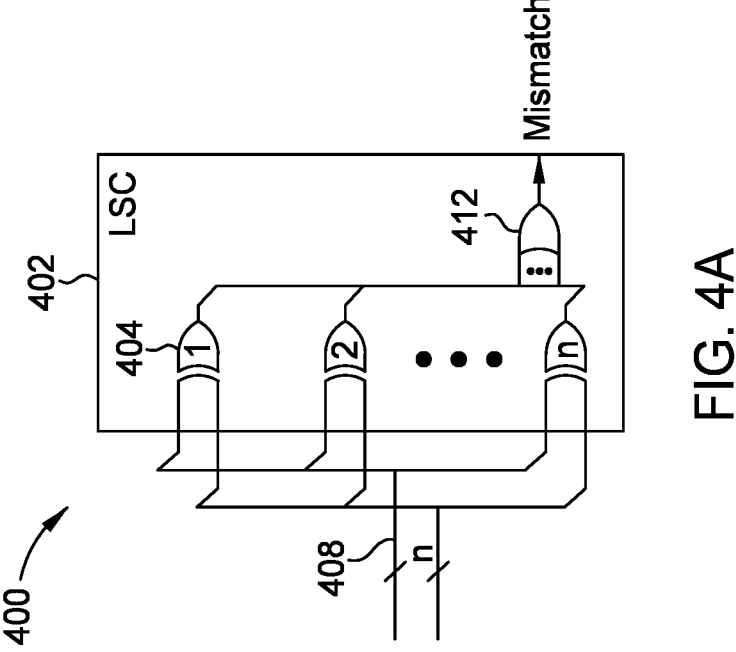
FIG. 4A illustrates an example, according to one example, of a Lockstep Checker Safety Mechanism.

FIG. 4A illustrates an example 400, according to one example, of a Lockstep Checker (LSC) Safety Mechanism 402.

A LSC is a type of SM where two or more circuits are running in lockstep. A CPU LSC is one type of LSC. In a CPU LSC, a CPU is duplicated to run in lock step with another CPU. The CPUs are fed by the same input, so the CPU outputs are supposed to be the same, if the CPUs are both functioning properly. The LSC contains a comparator comparing all of the outputs of the CPUs.

The two sets (each of n input lines) 408 are the input lines to the 2 CPU's running in lockstep and being checked by LSC 402. A LSC 402 utilizes XOR (Exclusive OR) circuitry 404 to compare an output from a main CPU with the corresponding output from a shadow CPU. A mismatch in the CPU outputs causes a logic one in the XOR circuitry 404.

An OR circuit 412 asserts the Mismatch output if any of the inputs do not match.

The LSC test does not indicate which CPU has a fault, rather the purpose of the LSC is to detect if either CPU has a fault.

FIG. 4B illustrates an example, according to one example, of a Lockstep Checker (LSC) Safety Mechanism 444 with Hardwired Pattern Generator 440. Functional block circuits with n input lines provide those same n inputs to the LSC 444 circuitry. This figure utilizes the Hardwired Pattern Generator 440 to produce the test patterns, instead of running an ATPG generator to generate the test patterns. Three input patterns are needed to detect all faults in the Exclusive OR.

XOR circuitry 448, coupled to an OR gate 452, receive data from the functional block circuits to detect a mismatch.

Figure 5A:
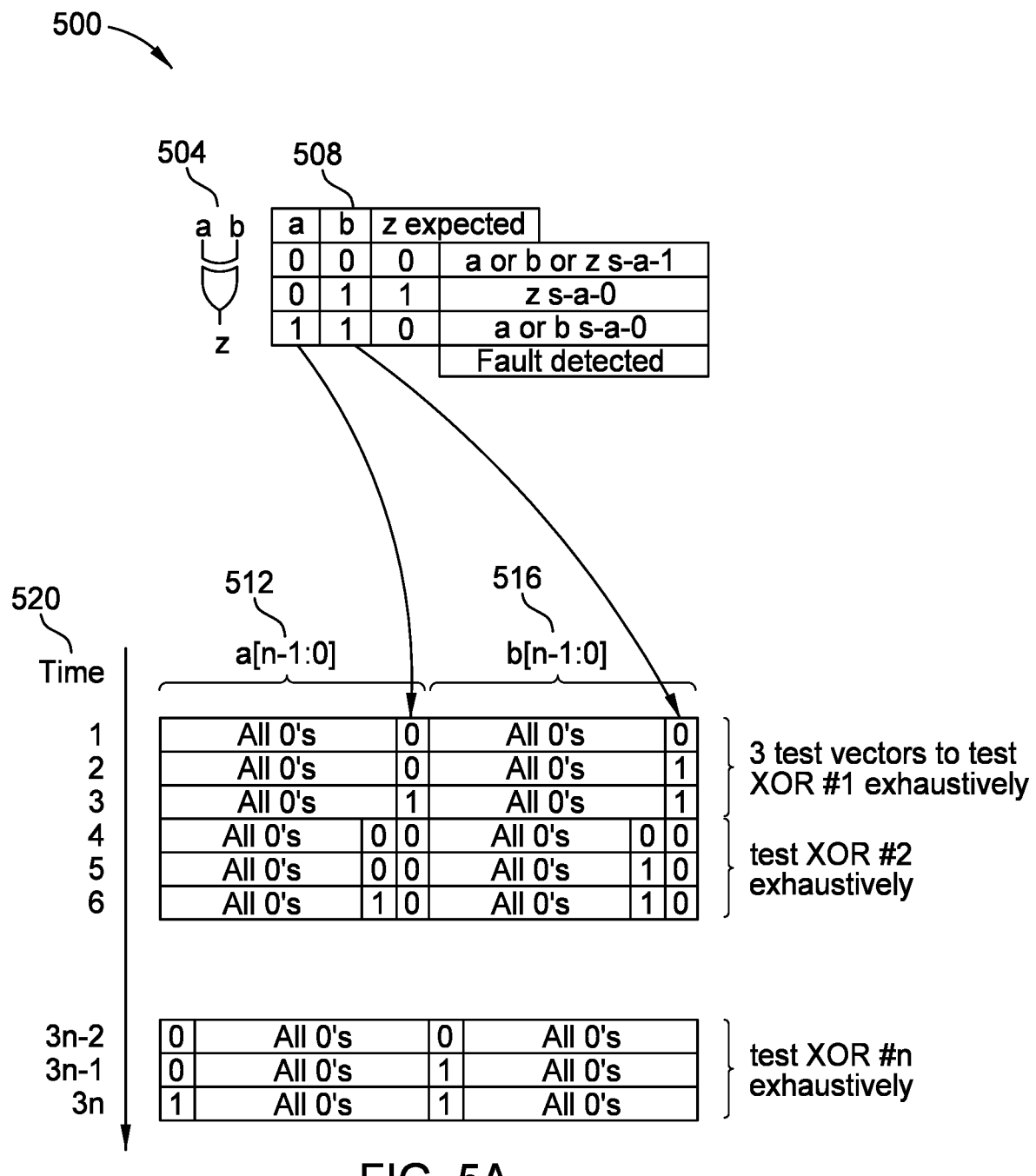
FIG. 5A illustrates an example, according to one example, of usage of a set of fixed Test Patterns, generated by a Hardwired Pattern Generator, for testing a Lockstep Checker Safety Mechanism built specifically with XOR gates.

FIG. 5A illustrates an example 500, according to one example, of test patterns for testing a Lockstep Checker Safety Mechanism. Table 512, 516 illustrates three test patterns sufficient to test all stuck-at faults of every XOR gate of a checker (402 in FIG. 4A). The Pattern Generator/Checker specifically targets XOR circuitry, so it can be used for Lock Step Checkers and other SMs that primarily rely on XOR circuitry, such as Parity SMs. Three test patterns are utilized to test all six possible stuck-bit faults of an XOR gate. Table 512, 516 represents the test patterns to be fed to inputs a[n−1:0] 512 and inputs b[n−1:0] 516 to exhaustively test all XOR gates, starting from XOR #1 until XOR #n.

Table 508 lists the three safety mechanism test patterns applied to input a and input b of Table 512, 516, and the expected output z of XOR gate 504, sufficient to detect all faults in any XOR gate.

At clock cycles 520, from 1 to 3n, the three test patterns above are input repeatedly to exhaustively test all XOR gates from 1 to n in the LSC SM.

If a fault in the SM XOR circuitry is detected, the SM fault detection circuitry is reported to an Error Handler as described previously.

A three-state counter can be used to generate the three safety mechanism test patterns shown in Table 508, triggered repeatedly by a second counter counting from 1 to n. These two counters along with a comparator to compare the output of the SM under test the expected output of the test pattern.

Figure 5B:
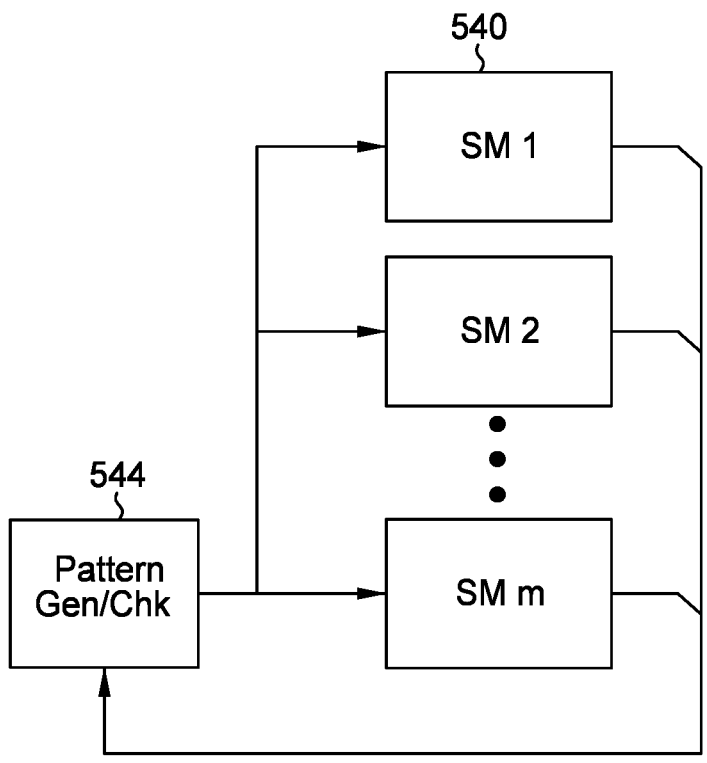
FIG. 5B illustrates an example, according to one example of a Pattern Generator/Checker Coupled to Multiple Safety Mechanisms.

FIG. 5B illustrates an example, according to one example of a Pattern Generator/Checker 544 Coupled to Multiple Safety Mechanisms 540 of a similar type.

To facilitate understanding, identical reference numerals have been used, where possible, to designate identical elements that are common to the figures. It is contemplated that elements of one example may be beneficially incorporated in other examples.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to specific examples, other and further examples may be devised without departing from the basic scope thereof, and the scope thereof is determined by the claims that follow.

What is claimed is:

1. A method for detecting faults in safety mechanism logic of a system-on-chip (SoC), the method comprising:
generating safety mechanism test patterns configured to verify functionality of the safety mechanism logic itself;
loading the safety mechanism test patterns into a pattern buffer coupled to the safety mechanisms comprised of a plurality of functional blocks;
transmitting the safety mechanism test patterns to the safety mechanisms; and
comparing, in error handler circuitry, outputs of the safety mechanism logic responsive to the test patterns with expected values to detect a fault in the safety mechanism logic.

2. The method of claim 1, wherein:
generating the safety mechanism test patterns includes using automatic test pattern generator (ATPG) software executed offline on a host computer to generate a set of safety mechanism test patterns targeted to a gate-level netlist implementation of the safety mechanism logic, the test patterns being generated prior to deployment on the SoC.

3. The method of claim 2, further comprising storing the safety mechanism test patterns in external memory.

4. The method of claim 2, wherein the safety mechanism test patterns contain n words comprising m/p number of inputs to the safety mechanisms, where n is a number of input lines to the safety mechanism, m is a width of test pattern words, and p is a partition factor.

5. The method of claim 2, further comprising:
receiving configuration information and a compiled target netlist model in the automatic test pattern generator.

6. The method of claim 1, wherein:
generating the safety mechanism test patterns includes generating a set of safety mechanism test patterns in a hard-wired pattern generator.

7. The method of claim 1, further comprising:
retrieving the safety mechanism test patterns from the pattern buffer into an assembler;
decoding the safety mechanism test patterns in the assembler; and
configuring the safety mechanism test patterns in the assembler for an input interface of the functional blocks.

8. The method of claim 1, further comprising:
detecting test point value errors in the error handler circuitry; and
notifying upstream logic when the test point value errors are detected.

9. The method of claim 1, wherein the safety mechanism test patterns are generated such that a safety mechanism test pattern count is reduced.

10. A fault detection circuit of a system-on-chip (SoC), the fault detection circuit comprising:
one or more safety mechanism logic circuits;
a pattern buffer coupled to the safety mechanism logic circuits and configured to store safety mechanism test patterns that are configured to verify functionality of the safety mechanism circuits themselves; and
error handler circuitry configured to compare outputs of the safety mechanism circuits responsive to the safety mechanism test patterns with expected values to detect a fault in the safety mechanism circuits.

11. The fault detection circuit of claim 10, further comprising:
an automatic test pattern generator implemented on a host computer and configured to compute the safety mechanism test patterns offline prior to deployment on the SoC.

12. The fault detection circuit of claim 11, further comprising external memory configured to store the safety mechanism test patterns.

13. The fault detection circuit of claim 11, wherein the safety mechanism test patterns contain n words comprising m/p number of inputs to the safety mechanisms, where n is a number of input lines to the safety mechanism, m is a width of test pattern words, and p is a partition factor.

14. The fault detection circuit of claim 11, wherein the automatic test pattern generator is configured to receive configuration information and a compiled target netlist model.

15. The fault detection circuit of claim 10, further comprising:
a hard-wired pattern generator configured to generate the safety mechanism test patterns.

16. The fault detection circuit of claim 10, further comprising:
an assembler configured to retrieve the safety mechanism test patterns from the pattern buffer, decode the safety mechanism test patterns, and configure the safety mechanism test patterns for an input interface of a functional block of the safety mechanisms.

17. The fault detection circuit of claim 10, wherein the error handler circuitry is configured to detect test point value errors.

18. The fault detection circuit of claim 10, wherein the safety mechanism test patterns comprise values of a binary code.

19. A system-on-chip (SoC), comprising:

one or more functional blocks;

a plurality of safety mechanism circuits respectively coupled to monitor the one or more functional blocks; and a pattern buffer coupled to the safety mechanism circuits and configured to store a plurality of safety mechanism test patterns that are configured to verify functionality of the safety mechanism circuits themselves.

20. The SoC of claim 19, further comprising:

an error handler circuit configured to compare outputs of the safety mechanism circuits responsive to the safety mechanism test patterns with expected values to detect a fault in the safety mechanism circuits.

* * * * *